(12) United States Patent
Hadjisoteriou et al.

(10) Patent No.: US 6,712,890 B2
(45) Date of Patent: Mar. 30, 2004

(54) METALLIZED AZO DYES AND INKS FOR INK-JET PRINTING CONTAINING SAME

(75) Inventors: Maria Soteri Hadjisoteriou, Blackley (GB); Rachel Anne James, Blackley (GB)

(73) Assignee: Avecia Limited, Blackley (GB)

( * ) Notice: Subject to any disclaimer, the term of this patent is extended or adjusted under 35 U.S.C. 154(b) by 9 days.

(21) Appl. No.: 10/050,178

(22) Filed: Jan. 18, 2002

(65) Prior Publication Data

US 2002/0130937 A1 Sep. 19, 2002

(30) Foreign Application Priority Data

Jan. 18, 2001 (GB) .............................................. 0101391
Jan. 18, 2001 (GB) .............................................. 0101392

(51) Int. Cl.$^7$ ........................ C09D 11/02; C09B 45/00; C09B 45/22; B41J 2/01
(52) U.S. Cl. ................. 106/31.47; 106/31.48; 106/31.49; 106/31.5; 106/31.51; 534/692; 534/703; 347/100
(58) Field of Search ........................... 106/31.47, 31.48, 106/31.49, 31.5, 31.51; 347/100; 534/692, 703

(56) References Cited

U.S. PATENT DOCUMENTS

| | | | | |
|---|---|---|---|---|
| 4,045,424 A | * | 8/1977 | Tartter ...................... | 534/693 |
| 4,052,374 A | * | 10/1977 | Baumann ................... | 534/695 |
| 4,086,223 A | * | 4/1978 | Steiner et al. .............. | 534/702 |
| 4,481,141 A | * | 11/1984 | Evans ....................... | 534/700 |
| 4,497,734 A | * | 2/1985 | Mennicke .................. | 534/695 |
| 4,710,198 A | * | 12/1987 | Beffa et al. ................ | 8/437 |
| 4,892,584 A | * | 1/1990 | Chapman ................. | 106/31.48 |
| 4,997,917 A | * | 3/1991 | Iff et al. .................... | 534/602 |
| 5,698,683 A | * | 12/1997 | Kaul et al. ................. | 534/692 |
| 6,001,161 A | * | 12/1999 | Evans et al. ............. | 106/31.48 |
| 6,132,894 A | * | 10/2000 | Kaul et al. ................. | 428/704 |
| 6,203,604 B1 | * | 3/2001 | Kashiwazaki et al. ..... | 106/31.5 |
| 6,524,378 B2 | * | 2/2003 | Erdtmann et al. ....... | 106/31.48 |
| 6,527,844 B2 | * | 3/2003 | Erdtmann et al. ....... | 106/31.48 |
| 2001/0004667 A1 | * | 6/2001 | Okubo et al. ............. | 534/692 |

* cited by examiner

*Primary Examiner*—Helene Klemanski
(74) *Attorney, Agent, or Firm*—Pillsbury Winthrop LLP

(57) ABSTRACT

A water soluble compound of Formula (1) or a salt thereof:
wherein:

Y is an electron withdrawing group;

$Y^1$ is H, alkyl or aryl, OR or $NR_2$ in which each R independently is H, optionally substituted alkyl or optionally substituted aryl;

or Y and $Y^1$ together form a 5- or 6- membered ring;

$X^1$ is a group or atom with co-ordinates with M;

M is hexa co-ordinate metal;

G is a group of Formula (2), (3) or (4); and $L^1$, $L^2$ and $L^3$, each independently represent ligands required to complete hexa-coordinate geometry around metal M;

wherein:

S is a water solubilizing group;

Ar is a benzene or naphthalene group in which X is located ortho to the azo group;

X is a group or atom which co-ordinates with M;

Z provides atoms or groups which complete an optionally substituted 5- or 6-membered aromatic heterocyclic ring;

Ring A is an optionally substituted aromatic ring;

Ring B is an optionally substituted 5- or 6-membered aromatic heterocyclic ring;

n is 0, 1, 2 or 3; and the * signify the points of attachment of the groups of Formulae (2), (3) and (4) to the N and M atoms in the compound of Formula (1).

The compounds are used in compositions for ink jet printing.

17 Claims, No Drawings

METALLIZED AZO DYES AND INKS FOR INK-JET PRINTING CONTAINING SAME

The present invention relates to water soluble compounds and their salts, to compositions containing such compounds and their use in ink jet printing ("IJP"), to ink jet printer cartridges and to ink jet printing processes.

IJP is a non-impact printing technique in which droplets of coloured liquids are ejected through a fine nozzle onto a substrate without bringing the nozzle into contact with the substrate.

IJP is a relatively inexpensive way of recording multi-colour images, for example pictures obtained from digital sources such as electronic cameras, scanners and the Internet. The use of ink jet printers to print colour images in the home or office environment is now becoming commonplace. However IJP has a big disadvantage compared to conventional silver halide photography in that the resultant images fade in ordinary daylight. Thus, there is a need to improve the light-fastness properties of prints to prevent images fading or vanishing, or becoming discoloured over time. In addition, there are many demanding performance requirements for dyes and inks used in IJP. For example sharp, non-feathered images having good water-fastness and optical density are required. The inks are required to dry quickly when applied to a substrate to prevent smudging, but they should not form a crust over the tip of an ink jet nozzle which stops the printer from working effectively. The inks should also be stable to storage over time without decomposing by forming a precipitate which could block the fine nozzle.

The choice of a colorant in ink jet systems is critical to image quality. The colorants should also have a high degree of light-fastness after printing onto a substrate. For aqueous dye-based inks, the dyes need to be sufficiently soluble in water to prepare a solution that is capable of producing adequate density on the substrate and be stable for extended periods of storage without precipitation. It is difficult to find dyes which meet all of these requirements, particularly yellow dyes.

U.S. Pat. Nos. 4,393,132, 4,183,755 and 4,148,643 disclose the formation of metal chelating compounds in the course of a reaction during photographic development followed by diffusion into a photographic image receiving layer in which the metallised dye is formed and immobilised. These patents do not specify the use of premetallised dyes and only refer to the formation of metal complexes on diffusion of the dye into the image receiving layer.

European patent 260,561 describes the use of related compounds for dyeing leather.

German OLS 2404314 describes certain formulations of Cr and Co coordinated dyes which would not be suitable as ink jet inks.

Water immiscible yellow dyes are described in U.S. Pat. Nos. 4,407,931 and 4,418,131 and are useful in photographic applications.

According to the present invention there is provided a water soluble compound of Formula (1) or a salt thereof:

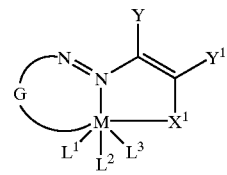

Formula (1)

wherein:
Y is an electron withdrawing group;
$Y^1$ is H, alkyl or aryl, OR or $NR_2$ in which each R independently is H, optionally substituted alkyl or optionally substituted aryl;
or Y and $Y^1$ together form a 5- or 6- membered ring;
$X^1$ is a group or atom which co-ordinates with M;
M is hexa co-ordinate metal;
G is a group of Formula (2), (3) or (4); and
$L^1$, $L^2$ and $L^3$, each independently represent ligands required to complete hexa-coordinate geometry around metal M;

Formula (2)

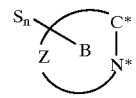

Formula (3)

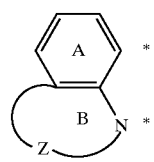

Formula (4)

wherein:
S is a water solubilizing group;
Ar is a benzene or naphthalene group in which X is located ortho to the azo group;
X is a group or atom which co-ordinates with M;
Z provides atoms or groups which complete an optionally substituted 5- or 6-membered aromatic heterocyclic ring;
Ring A is an optionally substituted aromatic ring;
Ring B is an optionally substituted 5- or 6-membered aromatic heterocyclic ring;
n is 0, 1, 2 or 3;
and the * signify the points of attachment of the groups of Formulae (2), (3) and (4) to the N and M atoms in the compound of Formula (1).

The compounds of Formula (1) preferably comprise at least one water solubilising group which is preferably a carboxy, amido, sulpho, sulphonamide or phosphato group which is preferably present in Y or $Y^1$, or is a substituent on Ring B or on Ring A preferably in a position para with respect to the azo group.

Y is preferably selected from CN, $CO_2H$, $CO_2R$, $CONR_2$, COR and $—SO_2NR_2$ in which each R is independently defined as above.

Where $Y^1$ is alkyl it is preferably $C_{1-8}$-alkyl, more preferably $C_{1-4}$-alkyl.

Where $Y^1$ is aryl it is preferably phenyl.

Where R is optionally substituted alkyl it is preferably $C_{1-8}$-alkyl, more preferably $C_{1-4}$-alkyl.

Where R is optionally substituted aryl it is preferably phenyl or naphthyl, more preferably phenyl.

Where R is optionally substituted alkyl or aryl optional substitutents are preferably selected from water solubilising groups, particularly $SO_3H$, $SO_2NR_2$, $CO_2H$ or $PO_3H_2$.

Where Y and $Y^1$ are joined together to form a 5- or 6-membered ring it is preferably pyrazolone or triazole, more preferably pyrazolone or 1, 3, 4-triazole.

X and $X^1$ each independently is preferably O, $CO_2R$ or NR in which R is defined above. Where X or $X^1$ is $CO_2R$ co-ordination to the metal occurs through an O atom and the C atom to which it is attached is included to form a 6-membered ring.

M is preferably $Zn^{2+}$, $Cu^{2+}$, $Co^{2+}$, $Co^{3+}$, $Pt^{2+}$, $Pd^{2+}$, $Cr^{3+}$ or $Ni^{2+}$.

Optional substitutents for Rings A and B are preferably selected from $C_{1-4}$-alkyl, aryl, $SO_3H$, $SO_2NR_2$, $CO_2H$ or $PO_3H_2$ in which R is as defined above.

In a first preferred embodiment of the present invention in the compound of Formula (1) G is a group of Formula (2), this is shown below as the compound of Formula (5).

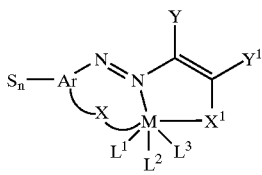

Formula (5)

in which Y, $Y^1$, X, $X^1$, M, Ar, $L^1$, $L^2$, $L^3$, S and n are as defined above.

In a second preferred embodiment of the present invention in the compound of Formula (1) G is a group of Formula (3), this is shown below in the compound of Formula (6).

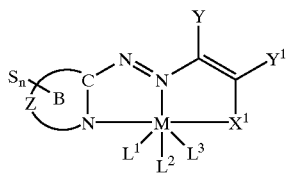

Formula (6)

in which Y, $Y^1$, $X^1$, M, $L^1$, $L^2$, $L^3$, Z, S, Ring B and n are as defined above.

In a third preferred embodiment of the present invention in the compound of Formula (1) G is a group of Formula (4), this is shown below as the compound of Formula (7);

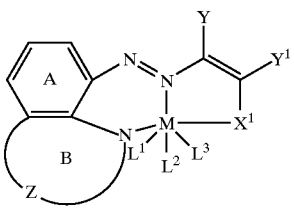

Formula (7)

in which Y, $Y^1$, $X^1$, M, $L^1$, $L^2$, $L^3$, Z and Rings A and B are as defined above.

In a further preferred embodiment of the present invention in the compound of Formula (1) is G is a group of Formula (4):

Z preferably comprises a chain of two or three carbon atoms or one or two carbon atoms and one nitrogen atom, more preferably Z is of formula —$CR^2$=$CR^2$—$CR^2$=wherein each $R^2$ is independently H or a substituent, of which one may be a hydrophilic group for example a carboxy, amido, sulpho, sulphonamide or phosphate group in order to increase the water solubility of the compound; it is preferred that any non hydrophilic substituent is H. It is especially preferred that X forms part of a quinoline group;

$X^1$ is preferably O or $NR^3$ wherein $R^3$ is H or optionally substituted alkyl.

Y is preferably CN, $CONR^4R^5$, $SO_2NR^4R^5$, $COR^4$ or $CO_2R^4$ wherein $R^4$ and $R^5$ are each independently H or $C_{1-4}$-alkyl groups which may be substituted by water-solubilising groups preferably carboxy, amido, sulpho, sulphonamide or phosphato groups;

or $R^4$ and $R^5$ together with the nitrogen atom to which they are attached form a 5- or 6-membered ring;

M is preferably $Zn^{2+}$, $Cu^{2+}$, $Co^{2+}$, $Co^{3+}$, $Pt^{2+}$, $Pd^{2+}$, $Cr^{3+}$ or $Ni^{2+}$, more preferably $Ni^{2+}$; and $L^1$, $L^2$ and $L^3$ represent three monodentate ligands, one bidentate ligand and one monodentate ligand or one tridentate ligand.

Monodentate ligands include cosolvents for the compound, for example lower alcohols (for example $C_{1-6}$-alkylOH, preferably $C_{1-4}$-alkylOH), tetrahydrofuran or ammonia.

The ligands $L^1$, $L^2$ and $L^3$ may be 3 separate independently selected monodentate ligands, or a monodentate ligand and a bidentate ligand or preferably a tridentate ligand; preferred tridentate ligands represented by $L^1$, $L^2$ and $L^3$ collectively are ligands of either Formula (8), Formula (9) or Formula (10) where Y, $Y^1$, X, $X^1$, Z, Ar, S, n and Rings A and B are as defined above and which incorporate water-solubilizing groups as mentioned above.

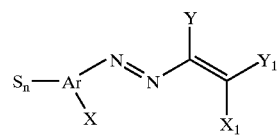

Formula (8)

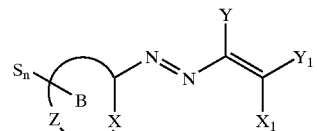

Formula (9)

In a particularly preferred embodiment the compounds of Formulae (5) and (6) are symmetrical 2:1 complexes of Formulae (11) and (12) wherein each Ar, X, $X^1$, Y, $Y^1$, Z, S, n, Ring B and M are as hereinbefore defined.

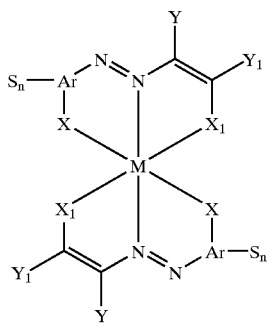

Formula (11)

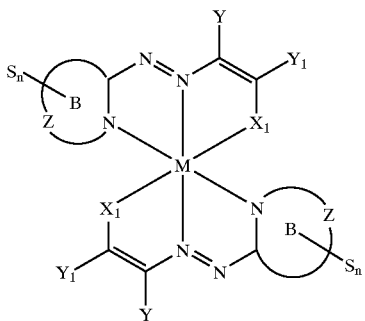

Formula (12)

M in Formula (5) is preferably $Zn^{2+}$, $Cu^{2+}$, or $Ni^{2+}$, more preferably $Ni^{2+}$ and M in Formula (6) is preferably $Zn^{2+}$, $Cu^{2+}$, $Co^{2+}$, $Co^{3+}$, $Cr^{3+}$ or $Ni^{2+}$, more preferably $Ni^{2+}$.

A preferred tridentate ligand represented by $L^1$, $L^2$ and $L^3$ collectively is a ligand of Formula (10) in which Y, $Y^1$, $X^1$, Z, and Rings A and B are as defined above and which possesses water-solubilising groups as specified for R above:

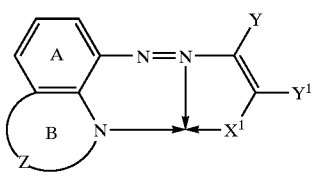

Formula (10)

A particularly preferred embodiment the compound of Formula (1) is of Formula (13):

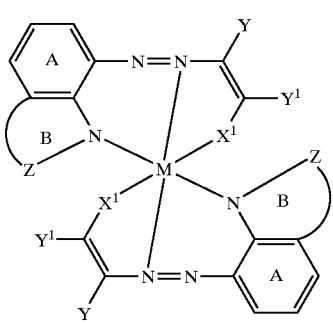

Formula (13)

in which each $X^1$, Y, $Y^1$, Z, M and Rings A and B are each independently as defined above.

In compounds of Formula (13) the preferences for $X^1$, Y, $Y^1$, Z, M and Rings A and B are as hereinbefore defined for the compounds of Formula (1).

The above compounds are preferably yellow dyes.

According to a further feature of the present invention there is provided a liquid ink composition suitable for ink jet printing which comprises an aqueous liquid medium and, dissolved therein, one or more compound(s) of Formulae (1), (5), (6), (7), (11), (12) and (13).

A preferred composition comprises:
(a) from 0.01 to 30 parts of a compound of the Formula (1), more preferably of Formula (3); and
(b) from 70 to 99.99 parts of the liquid medium;
wherein all parts are by weight and the number of parts of (a)+(b)=100.

Preferred liquid media include water or a mixture of water and one or more organic solvents.

When the liquid medium comprises a mixture of water and organic solvent, the weight ratio of water to organic solvent is preferably from 99:1 to 1:99, more preferably from 99:1 to 50:50 and especially from 95:5 to 80:20.

It is preferred that any organic solvent present in the mixture of water and organic solvent is water-miscible. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable ink media comprising a mixture of water and one or more organic solvents are described in U.S. Pat. Nos. 4,963,189, 4,703,113, 4,626,284 and EP 4,251,50A.

The solvent preferably has a boiling point of from 30° to 200° C., more preferably of from 40° to 150° C., especially from 50 to 125° C.

The liquid medium may also contain additional components conventionally used in ink jet printing inks, for example viscosity and surface tension modifiers, corrosion inhibitors, biocides (e.g. Proxel from Avecia Ltd), humectants, kogation reducing additives and surfactants which may be ionic or non-ionic.

Surfactants may be included in the liquid medium to adjust the surface tension of the compositions to an appropriate level. The surfactants are preferably anionic, cationic, amphoteric or nonionic.

Preferably the composition has been filtered through a filter having a mean pore size below 10 μm, more preferably below 5 μm, especially below 2 μm, more especially below 1 μm. In this way particulate matter is removed which could otherwise block the fine nozzles used in ink jet printers.

Preferably the composition has a viscosity of below 20 cp, more preferably below 10 cp, especially below 5 cp, at 20° C.

Preferably the compounds described herein have been purified by reverse osmosis, ultra-filtration, ion exchange or a combination thereof, either before or after they are incorporated in a liquid ink composition according to the present invention.

Preferably the liquid composition is yellow.

A further feature of the present invention provides a process for printing an image on a substrate comprising applying thereto by means of an ink jet printer a liquid ink composition which comprises an aqueous medium and dissolved therein one or more compounds of formulae (1), (5), (6), (7), (11), (12), and (13).

The ink jet printer preferably applies the composition to the substrate in the form of droplets which are ejected through a small orifice onto the substrate. Preferred ink jet printers are piezoelectric ink jet printers and thermal ink jet printers. In thermal ink jet printers, programmed pulses of heat are applied to the composition in a reservoir by means of a resistor adjacent to the orifice, thereby causing the composition to be ejected in the form of small droplets directed towards the substrate during relative movement between the substrate and the orifice. In piezoelectric ink jet printers the oscillation of a small crystal causes ejection of the composition from the orifice.

A further feature of the invention provides an ink jet printer cartridge, optionally refillable, containing a liquid ink composition which comprises an aqueous medium and dissolved therein one or more compounds of formulae (1), (5), (6), (7), (11), (12), and (13).

The substrate is preferably paper, plastic, a textile, metal or glass, more preferably paper, an overhead projector slide or a textile material, especially paper.

Preferred papers are plain or treated papers which may have an acid, alkaline or neutral character.

A further aspect of the present invention provides separately a paper, an overhead projector slide and a textile material printed with a liquid ink composition according to the present invention or by means of a process as defined above.

When the substrate is a textile material the liquid ink composition of the present invention is preferably applied thereto by:

i) applying the ink to the textile material using an ink jet printer; and ii) heating the printed textile material at a temperature of from 50° C. to 250° C.

Preferred textile materials are natural, synthetic and semi-synthetic materials. Examples of preferred natural textile materials include wool, silk, hair and cellulosic materials, particularly coffon, jute, hemp, flax and linen. Examples of preferred synthetic and semi-synthetic materials include polyamides, polyesters, polyacrylonitriles and polyurethanes.

Preferably the textile material has been treated with an aqueous pre-treatment composition comprising a thickening agent and optionally a water-soluble base and a hydrotropic agent and dried prior to step i) above.

The pre-treatment composition preferably comprises a solution of the base and the hydrotropic agent in water containing the thickening agent. Particularly preferred pre-treatment compositions are described more fully in European Patent Application No.534660.

The invention also provides a process of ink jet printing in which droplets of a liquid ink composition according to the invention are deposited on a suitable substrate.

The invention is further illustrated by the following Examples in which all parts and percentages are by weight unless otherwise stated.

EXAMPLES

The following procedures provide examples for preparation of dyes of general Formula 1. A range of dyes can be made by variations in the coupling component and aromatic amine.

Example 1

Dye 1 and Dye 2

1. Preparation of 8-amino-5-quinoline Sulphonic Acid (I)

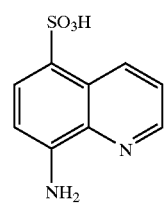

(I)

A solution of 8-hydroxy-5-quinoline sulfonic acid (0.2 mol, 45 g) and sodium bisulfite (0.4 mol, 41.6 g) in water (200 mL) and aqueous ammonia solution (35%) (100 mL) was heated to reflux for 3 days, the initial slurry dissolved to form a clear orange solution. This solution was cooled to room temperature and acidified to pH 2 by the careful addition of concentrated HCl. A yellow solid was precipitated and isolated by filtration. The reversible nature of this reaction means that the product obtained at this stage is a mixture of the desired amino-quinoline and the starting hydroxy quinoline. This mixture was then dissolved in pyridine (150 mL), chilled in an ice bath and acetic anhydride (30 mL) added gradually. The solution was stirred for 1 hour and the N-acylated product precipitated by addition of acetone. This product was isolated by filtration as an off-white solid (approx. 25 g) which was suspended in water (30 mL) and heated to dissolve. Concentrated HCl (30 mL)

was added and the solution heated at reflux for 1 h during which time the amino-quinoline product precipitated. The reaction mixture was cooled to room temperature and the clean product was isolated by filtration as a yellow powder (15 g, 33%); m/z (ES$^-$) 223; $^1$H NMR (D$_2$O)d 8.82 (dd, J=8.3, 2.2 Hz, 1H), 8.69 (dd, J=4.4, 2.2 Hz, 1H), 7.93 (d, J=8.0 Hz, 1H), 7.63 (dd, J=8.8, 4.4 Hz, 1H), 6.96 (d, J=8.0 Hz, 1H).

2. Preparation of Acetoacetamide Derived Ligand (II)

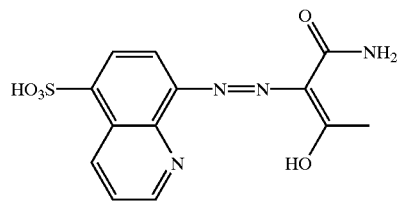

A stirred solution of 8-amino-5-quinoline sulfonic acid (11.2 g, approximate purity 60%) in water (150 mL) and ethanol (80 mL) was chilled in an ice bath and concentrated. HCl (17 mL) added. This was followed by the addition of sodium nitrite (2.76 g, 40 mmol) and the mixture stirred at 0° C. for 1 h a give adiazenium salt solution. Sulphamic acid was added to quench excess nitrous acid using sulphone indicator to show when excess nitrous acid is consumed.

Separately a solution of acetoacetamide (4.55 g, 45 mmol) and sodium carbonate (20 g) in water (100 mL) was chilled in an ice bath. The solution of diazonium salt was added gradually controlling the pH between pH 8–9 by addition of sodium carbonate and the reaction stirred for 1 h. Analysis of the reaction mixture by HPLC indicated complete conversion to the desired product. The reaction mixture was acidified to pH 5 by addition of glacial acetic acid and the solution left to stand for 2 days. The solution was then filtered to provide the product as a yellow solid (5 g, yield based on 60% purity of starting material approx. 50%); m/z (ES$^-$) 335; $^1$H NMR (D$_2$O) d 8.61 (dd, J=8.3, 1.9 Hz, 1H), 8.33 (dd, J=4.4, 1.8 Hz, 1H), 7.71 (d, J=8.3 Hz, 1H), 7.32 (dd, J=8.0, 4.3 Hz, 1H), 6.95 (d, J=8.3 Hz, 1H), 1.81 (s, 3H).

3. Preparation of Nickel Complexes of Formula 1

A solution of nickel acetate tetrahydrate (1.49 g, 6 mmol) in a 50:50 water ethanol mix was added dropwise over 30 minutes to a stirred suspension of acetoacetamide ligand (II) (4.0 g, 12 mmol) in THF (30 mL) and ethanol (30 mL) under a nitrogen atmosphere. On addition of the nickel salt the ligand dissolved to form a deep yellow/brown solution. HPLC analysis of the reaction mixture on completion of addition of nickel acetate showed the formation of 2 new species in an approximately 2:1 ratio. Stirring of the reaction was continued for 2 days after which time both products were still present with no noticeable change in the relative quantities. The solution was concentrated in vacuo and the residue suspended in ethanol and with stirring heated to boiling. On cooling the reaction mixture was filtered to provide an orange-brown solid of limited water solubility which was shown by HPLC to consist mainly of the minor product of (Dye 2) (approx. 90% purity, 1.1 g). The filtrate was re-concentrated invacuo to provide a reddish crystalline solid which was recrystallised from ethanol to provide the major product (Dye 1) (1.7 g). Both products were further purified by dialysis. MS analysis of the complexes shows the minor product to be a 1:1 nickel complex m/z (FAB$^-$) 392 and the major product to be a 2:1 complex m/z (FAB$^-$) 727.

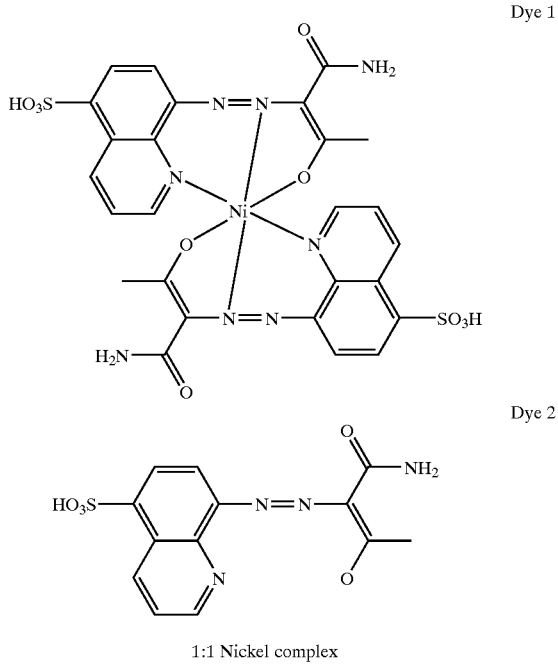

Example 2

Dye 3

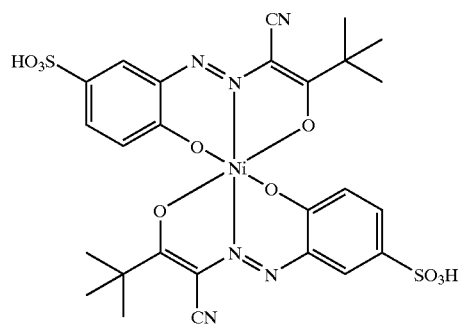

Dye 3 was prepared as follows
Preparation of Ligand (IV) by Coupling of 3-amino-4-hydroxy Benzene Sulfonic Acid and Pivaloyl Acetonitrile

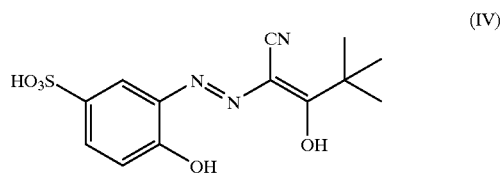

A solution of 3-amino-4-hydroxy benzene sulfonic acid hydrate (50 mmol, 9.45 g) in water (approx. 200 mL) was cooled to 0° C. in an ice bath. Concentrated HCl (20 mL) was added followed by the addition of sodium nitrite (50 mmol, 3.45 g) and the reaction stirred at 0° C. for 1 h to give a diazonium salt solution. Excess nitrous acid was then quenched by addition of sulfamic acid.

Separately a solution of pivaloyl acetonitrile (55 mmol, 6.88 g) and sodium carbonate (approx. 50 g) in water (150 mL) was cooled to 0° C. in an ice bath. The diazonium salt solution was gradually added and the pH maintained at >pH8 by addition of sodium carbonate. The reaction mixture was then stirred at 0° C. for 1 h after which time HPLC analysis showed only 1 peak corresponding to the product. The reaction was then acidified to pH 5 by addition of concentrated HCl and the product isolated by filtration as a yellow powder; m/z (ES$^-$) 324; $^1$H NMR (D$_2$) d 7.83 (s, 1H), 7.47 (dd, J=8.6, 2.6 Hz, 1H), 6.88 (d, J=8.6 Hz, 1H), 1.40 (s, 9H).

Preparation of Dye 3

A solution of nickel acetate tetrahydrate (3.73 g, 15 mmol) in a 50:50 water, ethanol mix was added dropwise over 30 minutes to a stirred suspension of the ligand (10.0 g, 30.8 mmol) in THF (50 mL) and ethanol (100 mL) under a nitrogen atmosphere. After stirring at room temperature for 2 hours HPLC analysis showed the presence of a new species and no remaining starting material. The reaction mixture was filtered to provide a yellow/brown solid (8.7 g) which was purified by dialysis. FAB MS indicated that this product is the 2:1 nickel complex; (FAB$^-$) 705.

Examples 3–5

Dyes 4–6

Further examples of dyes of general Formula (1) were prepared by the above procedures by variation of the coupling components and aromatic amines.

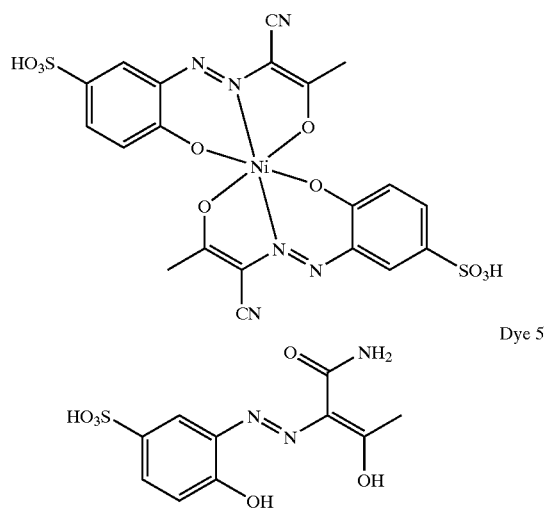

Dye 4

Dye 5

(1:1 Nickel complex)

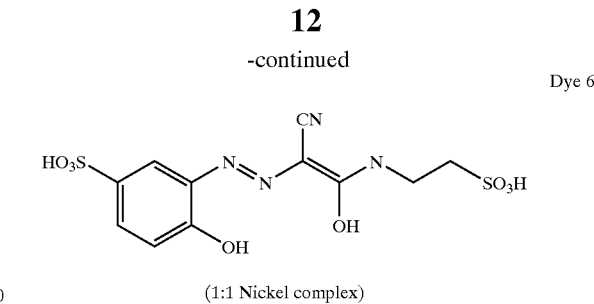

Dye 6

(1:1 Nickel complex)

Preparation of Water Solubilized Coupling Component (Ref. U.S. Pat. No. 5,376,513) N-(2-ethane Sulfonic Acid) Cyanoacetamide (III) (for Preparation of Dye 5)

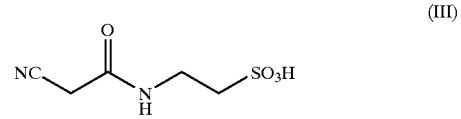

(III)

A suspension of taurine (25 g, 0.2 mol) and potassium hydroxide (13.5 g, 0.24 mol) in methanol (100 mL) was heated to reflux. Ethyl cyanoacetate (24.9 g, 0.22 mol) was added dropwise over the course of 1 h. The mixture was refluxed for a further 5 h during which time the reaction mixture solidified, allowed to cool and left to stand overnight. The solid product was isolated by filtration and purified by recrystalisation from ethanol to give the acetamide product as a white solid (34.6 g, 90%);m/z (ES$^-$) 313; $^1$H NMR (D$_2$O) d 3.10 (t, J=6.9 Hz, 2H), 3.27 (t, J=5.8 Hz, 1H), 3.42 (t, J=5.8 Hz, 1H), 3.60 (t, J=6.9 Hz, 2H).

Examples of Formula (1) in which G is of Formula (3).

These dyes were prepared via means of the diazotisation followed by coupling of the 2-amino-pyridine N-oxide according to the procedure shown above. The N-oxide was cleaved to provide the pyridine ligand for example by treatment with phosphorus trichloride. Metallation to provide the complexes was achieved by treatment with nickel acetate as described above.

Preparation of Pyridine N-oxides (Ref. Deady, L. W; Synth. Commun. 1977, 7(8), 509)

To a solution of amino pyridine (50 g, 0.53 mol) in acetone (900 OmL) a solution of 3-chloro perbenzoic acid (112.2 g, 0.65 mol) in acetone (300 mL) was added and the reaction mixture stirred at room temperature for 30 min. Diethyl ether (500 mL) was added and the solution acidified to pH 4 with concentrated HCl. The amino pyridine-N-oxide hydrochloride salt was then isolated by filtration as an off-white powder (62 g, 80%); m/z (ES$^+$) 111; $^1$H NMR (d$_6$ DMSO) d 8.14 (dd, J=6.9, 1.8 Hz, 1H), 7.66 (s, 2H, NH$_2$), 7.47 (dt, J=7.6, 1.5 Hz, 1H), 6.99 (dd, J=8.1, 1.5 Hz, 1H), 6.72 (dt, J=7.6, 1.8 Hz, 1H).

Ligand Formation Reactions

1) For example the ligand for Dye 10 was made via diazotisation of an amino-triazoles as follows:

2-Amino-5-carboxy-1,3,4-triazole (6.85 g, 50 mmol) was dissolved in water (150 mL) at pH 8–9 and a 1M solution of sodium nitrite (3.80 g, 55 mmol) added. This solution was then cooled to 0–5° C. and then gradually added (over 20 mins) to concentrated HCl (25 mL) at 0–5° C. to form a diazonium suspension over the approximately 90 mins after which time excess nitrous acid was quenched by addition of sulfamic acid. The diazonium suspension was added gradually to a solution of 3-methyl-1-(4-sulfophenyl)-2-pyrazolin-2-one (13.98 g, 55 mmol) at 0° C. in a 50:50 methanol: water mix (300 mL). The reaction mixture was stirred for 90 min and the pH then raised to pH 5 by addition of sodium carbonate and allowed to warm to room temperature overnight. The product was isolated by filtration, dialysed and dried to provide the ligand as a yellow solid (19.65 g).

All other diazotisation reactions were carried out by a similar method with the exception of those utilising amino-pyrazoles.

2) For example the ligand for Dye 11 was made via diazotisation of an amino-pyrazole as follows:

A mixture of acetic acid (15 mL) and propionic acid (10 mL) were cooled to 0–5° C. and nitrosyl sulphuric acid (4.57 g, 36 mmol) added gradually over 10 mins. The mixture was stirred for 15 mins. A solution of 3-amino-4-carbethoxypyrazole (30 mmol, 4.65 g) in acetic acid (15 mL) and propionic acid (10 mL) was added dropwise and the diazonium salt allowed to form for a further 45 mins. Excess nitrous acid was then quenched by the addition of sulfamic acid and the diazonium solution added gradually to a solution of N-methyl-4-sulfomethyl-pyridone (7.01 g, 32 mmol) in water (200 ml) at 0–5° C. On completion of the addition the pH was raised to pH3–4 by addition of 2MNaOH. The reaction mixture was stirred overnight and filtered to obtain the product as a yellow solid which was purified by stirring with acetone and refiltering (Yield=7.0 g).

The carbethoxypyrazole was hydrolysed to the carboxypyrazole by heating at 70° C. in 2M NaOH for approx 30 mins.

Metallisation Prep for Dye 10

To a solution of the ligand (6.00 g, 16.75 mmol) in water (100 mL) at pH8 a solution of nickel acetate (2.23 g, 9 mmol) in water (50 mL) was addeddropwise over the course of 15 mins. The pH throughout the addition was maintained at pH8 by addition of 2MNaOH. HPLC analysis of the reaction mixture after 1 h showed the appearance of a new species (?max=465.9 nm) as well as residual unreacted ligand. A solution of additional nickel acetate (8 mmol) in water was then added and the reaction mixture stirred for a further 1 h after which time HPLC analysis showed complete conversion of the ligand to the new species. The solution was then partially concentrated in vacuo and then passed down an IDA (imino-diacetic acid) column (to remove excess free nickel salts). The deep brown solution was then dialysed and dried to provide metal complex Dye 10 (5.65 g).

Other metallisation reactions carried out according to a similar procedure to Dye 10.

Examples 6–10

Dyes 8–12

The following metallised dye structures were prepared by methods described above or analogous methods:

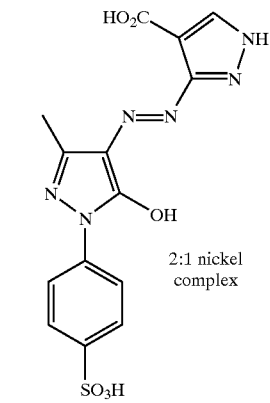

Dye 8

2:1 nickel complex

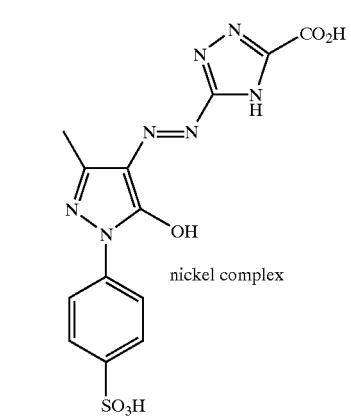

Dye 9 nickel complex

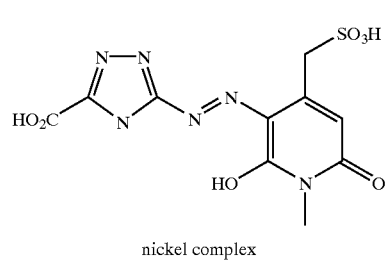

Dye 10 nickel complex

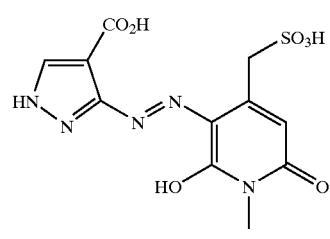

Dye 11

2:1 nickel complex

-continued

Dye 12

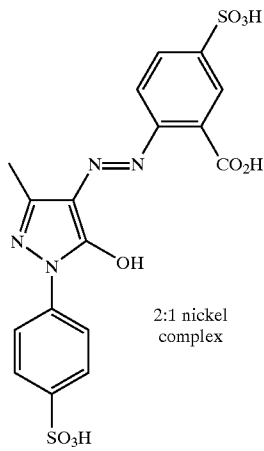

2:1 nickel complex

Results Table

Dyes 1–6 and 9–12 and unmetallised Comparative Dye 7 were formulated into inks and applied to a substrate by means of an ink jet printer. The ink formulation used comprised 88% water, 5% 2-pyrrolidone, 5% thiodiglycol and 2% of the surfactant Surfynol 465. Results for Dyes 2 and 3 are not included as they were not sufficiently water soluble. Results using commercial dyes Fast Yellow 2 and Yellow 1G are also included in the Table for comparison. All dyes were tested on a range of commercially available papers namely Canon PR101, SEC PM (from Seiko Epson).

TABLE

| Dye | Substrate | ROD[a] | L[a] | a[a] | b[a] | C[a] | h[a] | LF 100 HRs DE |
|---|---|---|---|---|---|---|---|---|
| FY2 control | PR101 | 0.95 | 89 | −9 | 93 | 94 | 96 | 5.4 |
|  | SEC PM | 0.95 | 88 | −12 | 94 | 95 | 97 | 2.4 |
| Y1G control | PR101 | 1.398 | 84 | −1 | 111 | 111 | 90 | 10.9 |
|  | SEC PM | 1.442 | 85 | −2 | 115 | 115 | 91 | 11.9 |
| Dye 4 | PR101 | 1.45 | 72 | 18 | 88 | 90 | 78 | 16.7 |
|  | SEC PM | 1.545 | 71 | 21 | 90 | 92 | 77 | 14.5 |
| Dye 5 | PR101 | 1.141 | 82 | 4 | 92 | 92 | 88 | 13.3 |
|  | SEC PM | 1.015 | 83 | −3 | 88 | 88 | 92 | 16.3 |
| Dye 6 | PR101 | 1.107 | 79 | 5 | 84 | 85 | 87 | 19.5 |
|  | SEC PM | 1.076 | 80 | 1 | 85 | 85 | 90 | 26.8 |
| Comparative Dye 7 | PR101 | 0.946 | 79 | 11 | 70 | 71 | 81 | 66.5 |
|  | SEC PM | 0.684 | 88 | −10 | 69 | 70 | 98 | 71.3 |
| Dye 9 | PR101 | 0.6 | 91 | −12 | 63 | 64 | 101 | 11.5 |
|  | SEC PM | 0.6 | 90 | −14 | 68 | 70 | 102 | 3.7 |
| Dye 10 | PR101 | 1.5 | 76 | 20 | 94 | 96 | 78 | 55.8 |
|  | SEC PM | 1.6 | 78 | 13 | 102 | 102 | 83 | 19.2 |
| Dye 11 | PR101 | 1.4 | 7.6 | 18 | 91 | 92 | 79 | 26.0 |
|  | SEC PM | 1.4 | 79 | 12 | 101 | 102 | 83 | 10.5 |
| Dye 12 | PR101 | 0.9 | 85 | −3 | 79 | 79 | 92 | 11.9 |
|  | SEC PM | 0.9 | 86 | −6 | 83 | 83 | 94 | 5.0 |

[a] ROD is relative optical density;
L, a and b are the colour co-ordinates;
h is the hue angle;
C is chroma value;
LF is lightfastness measured over 100 hours Dye 7

(structure)

Yellow 1G

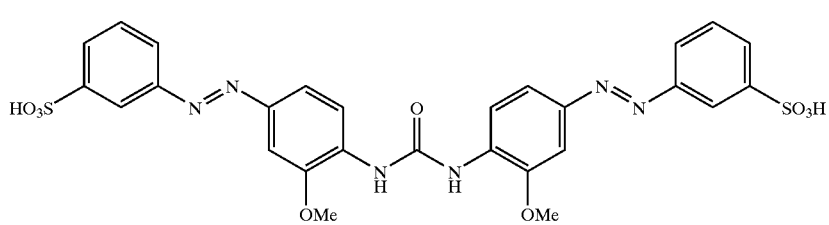

Fast Yellow 2

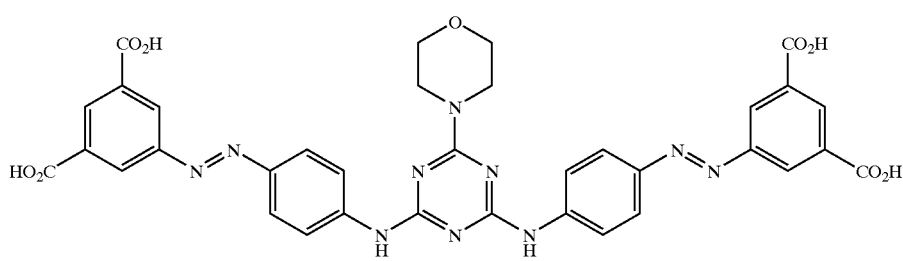

The above results show that the novel metallised dyes of this invention exhibit far superior properties to the unmetallised dye (comparative Dye 7) both in terms of optical density and lightfastness. Lightfastness and optical density for all metallised dyes were good.

What is claimed is:

1. A water soluble compound of Formula (1) or a salt thereof:

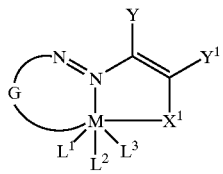

Formula (1)

wherein:

Y is an electron withdrawing group;

$Y^1$ is H, alkyl or aryl, OR or $NR_2$ in which each R independently is H, optionally substituted alkyl or optionally substituted aryl; or Y and $Y^1$ together form a 5- or 6- membered ring;

$X^1$ is a group or atom which co-ordinates with M;

M is hexa co-ordinate metal;

G is a group of Formula (2), (3) or (4); and $L^1$, $L^2$ and $L^3$, each independently represent ligands required to complete hexa-coordinate geometry around metal M;

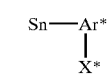

Formula (2)

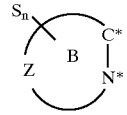

Formula (3)

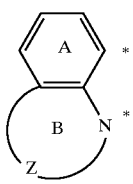

Formula (4)

wherein:

S is a water solubilizing group;

Ar is a benzene or naphthalene group in which X is located ortho to the azo group;

X is a group or atom which coordinates with M;

Z provides atoms or groups which complete an optionally substituted 5- or 6-membered aromatic heterocyclic ring;

Ring A is an optionally substituted aromatic ring;

Ring B is an optionally substituted 5- or 6-membered aromatic heterocyclic ring;

n is 0, 1, 2 or 3;

and the * signify the points of attachment of the groups of Formulae (2), (3) and (4) to the N and M atoms in the compound of Formula (1).

2. A compound according to claim 1 in which G is a group of Formula (2), which is shown as the compound of Formula (5):

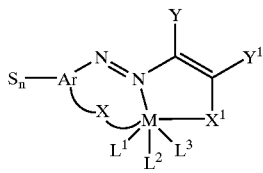

Formula (5)

wherein:

Y is an electron withdrawing group;

$Y^1$ is H, alkyl or aryl, OR or $NR_2$ in which each R independently is H, optionally substituted alkyl or optionally substituted aryl; or Y and $Y^1$ together form a 5- or 6-membered ring;

$X^1$ is a group or atom with co-ordinates with M;

M is hexa co-ordinate metal;

$L^1$, $L^2$ and $L^3$, each independently represent ligands required to complete hexa-coordinate geometry around metal M;

S is a water solubilizing group;

Ar is a benzene or naphthalene group in which X is located ortho to the azo group;

X is a group or atom which co-ordinates with M;

Ring A is an optionally substituted aromatic ring;

Ring B is an optionally substituted 5- or 6-membered aromatic heterocyclic ring; and n is 0, 1, 2 or 3.

3. A compound according to claim 1 in which G is said group of Formula (3), which is shown as the compound of Formula (6):

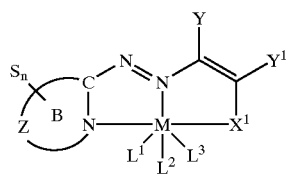

Formula (6)

wherein:

Y is an electron withdrawing group;

$Y^1$ is H, alkyl or aryl, OR or $NR_2$ in which each R independently is H, optionally substituted alkyl or optionally substituted aryl; or Y and $Y^1$ together form a 5- or 6-membered ring;

$X^1$ is a group or atom with coordinates with M;

M is hexa co-ordinate metal;

$L^1$, $L^2$ and $L^3$, each independently represent ligands required to complete hexa-coordinate geometry around metal M;

S is a water solubilizing group;

Z provides atoms or groups which complete an optionally substituted 5- or 6-membered aromatic heterocyclic ring; and n is 0, 1, 2 or 3.

4. A compound according to claim 1 in which G is said group of Formula (4), which is shown as the compound of Formula (7);

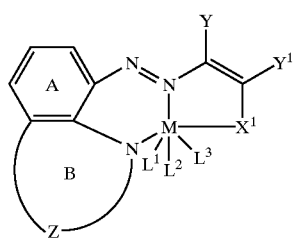

Formula (7)

wherein:
Y is an electron withdrawing group;
$Y^1$ is H, alkyl or aryl, OR or $NR_2$ in which each R independently is H, optionally substituted alkyl or optionally substituted aryl; or
Y and $Y^1$ together form a 5- or 6-membered ring;
$X^1$ is a group or atom with coordinates with M;
M is hexa coordinate metal;
$L^1$, $L^2$ and $L^3$, each independently represent ligands required to complete hexa-coordinate geometry around metal M;
Z provides atoms or groups which complete an optionally substituted 5- or 6-membered aromatic heterocyclic ring;
Ring A is an optionally substituted aromatic ring;
Ring B is an optionally substituted 5- or 6-membered aromatic heterocyclic ring; and
n is 0, 1, 2 or 3.

5. A liquid ink composition suitable for ink jet printing which comprises an aqueous liquid medium and, dissolved therein, a compound as claimed in any one of claims 1, 2, 3 or 4.

6. A process for printing an image on a substrate comprising applying thereto by means of an ink jet printer a liquid ink composition according to claim 5.

7. A process according to claim 6 in which the substrate is paper or a plastic sheet.

8. A process according to claim 6 in which the substrate is a textile material.

9. An ink jet printer cartridge containing a liquid ink composition according to claim 5.

10. A compound according to claim 1, wherein $L^1$, $L^2$, and $L^3$, independently represent monodentate ligands.

11. A compound according to claim 1, wherein $L^1$, $L^2$, and $L^3$, independently, represent one monodentate ligand and one bidentate ligand.

12. A compound according to claim 1, wherein $L^1$, $L^2$, and $L^3$, independently, represent one tridentate ligand.

13. A compound according to claim 12, wherein the tridentate ligand is represented by the following formula (8), or formula (9) or formula (10):

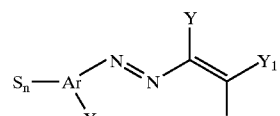

Formula (8)

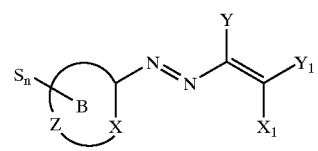

Formula (9)

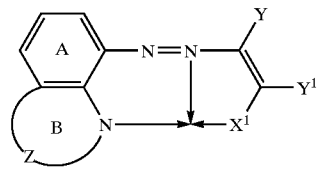

Formula (10)

wherein Ring A, Ring B, X, $X^1$, Y, $Y^1$, and Z are as defined above.

14. A compound according to claim 1, represented by the formula (13):

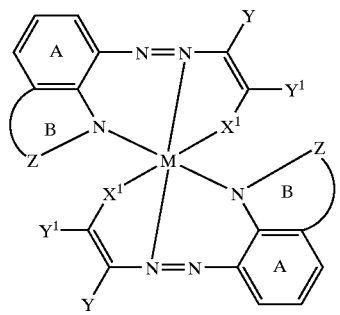

Formula (13)

where Ring A, Ring B, $X^1$, Y, $Y^1$ and Z are as defined above.

15. A liquid ink composition suitable for ink jet printing which comprises an aqueous liquid medium and, dissolved therein, a compound as claimed in claim 13.

16. A process for printing an image on a substrate comprising applying thereto by means of an ink jet printer a liquid ink composition according to claim 15.

17. An ink jet printer cartridge containing a liquid ink composition according to claim 15.

* * * * *